(12) United States Patent
Neusbul (10) Patent No.: US 7,375,350 B2
(45) Date of Patent: May 20, 2008

(54) COMPUTED RADIOGRAPHY X-RAY CASSETTE WITH RIGID EMBEDDED CR PLATE

(76) Inventor: Stephen Neusbul, 106 S. Helberta Ave., Redondo Beach, CA (US) 90277

(*) Notice: Subject to any disclaimer, the term of this patent is extended or adjusted under 35 U.S.C. 154(b) by 552 days.

(21) Appl. No.: 10/714,087

(22) Filed: Nov. 13, 2003

(65) Prior Publication Data

US 2004/0130763 A1    Jul. 8, 2004

Related U.S. Application Data (60) Continuation-in-part of application No. 10/386,326, filed on Mar. 10, 2003, which is a division of application No. 09/747,616, filed on Dec. 20, 2000, now Pat. No. 6,532,092, which is a continuation of application No. 09/450,031, filed on Nov. 24, 1999, now Pat. No. 6,188,501.

(51) Int. Cl.
*H05B 33/00* (2006.01)
(52) U.S. Cl. .................................................. 250/484.4
(58) Field of Classification Search .............. 250/484.4
See application file for complete search history.

(56) References Cited

U.S. PATENT DOCUMENTS

| 1,431,271 A | 10/1922 | Van Allen |
| 3,694,653 A | 9/1972 | Allard et al. |
| 3,896,576 A | 7/1975 | Wolf et al. |
| 4,628,356 A | 12/1986 | Spillman et al. |
| 4,870,285 A * | 9/1989 | Ohgoda ................ 250/484.4 |
| 4,879,604 A | 11/1989 | Koshiyouji |
| 4,908,876 A | 3/1990 | DeForest et al. |
| 4,931,641 A * | 6/1990 | Ohgoda ..................... 250/589 |
| 4,996,785 A | 3/1991 | Cicenas |
| 5,025,157 A | 6/1991 | Katsuaki |
| 5,068,909 A | 11/1991 | Rutherford et al. |
| 5,241,406 A | 8/1993 | Johnston et al. |
| 5,245,539 A | 9/1993 | Romeas et al. |
| 5,308,994 A * | 5/1994 | Ohta et al. ................ 250/589 |
| 5,321,520 A | 6/1994 | Inga et al. |

(Continued)

FOREIGN PATENT DOCUMENTS

EP    0 162 528    11/1985

(Continued)

OTHER PUBLICATIONS

A. Allam, *Letter to the Editor: Low Cost Autonomous System of Image Acquisition and Processing Using a Linear CCD Camera*, L'Onde Electrique, Vo. 72, No. 2, Mar./Apr. 1992, pp. 54-56.

(Continued)

*Primary Examiner*—David Porta
*Assistant Examiner*—Mindy Vu
(74) *Attorney, Agent, or Firm*—Blakely, Sokoloff, Taylor & Zafman, LLP (57) ABSTRACT

Embodiments include a method and apparatus for improving the reusability of a computed radiography (CR) plate by housing it in a cassette. The CR plate remains in the cassette during scanning. The embodiments of the method and apparatus improve the reusability of the CR plate.

5 Claims, 5 Drawing Sheets

U.S. PATENT DOCUMENTS

| | | | |
|---|---|---|---|
| 5,340,995 A | | 8/1994 | Verbeke et al. |
| 5,384,862 A | | 1/1995 | Echerer et al. |
| 5,441,251 A | * | 8/1995 | Ohta ......................... 271/145 |
| 5,814,809 A | | 9/1998 | Han |
| 5,861,631 A | * | 1/1999 | Wendlandt et al. ...... 250/484.4 |
| 6,068,439 A | * | 5/2000 | Ohta ......................... 414/411 |
| 2004/0124368 A1 | * | 7/2004 | Struye et al. ............ 250/484.4 |

FOREIGN PATENT DOCUMENTS

| | | |
|---|---|---|
| EP | 0 598 949 A1 | 11/1992 |
| EP | 0601355 | 6/1994 |
| EP | 0729264 A2 | 6/1995 |
| WO | WO 95/19680 | 6/1994 |

OTHER PUBLICATIONS

A. Allam, *Lettre a l'editeur: systeme d'acquisition et de traitement d'image autonome a faible cout par camera lineaire CCD*, L'Onde Electrique, vol. 72, No. 2, Mar./Apr. 1992, pp. 54-56.

Patent Abracts of Japan, Vo. 014, No. 161 (E-0909), Mar. 28, 1990, & JP-A-02 016863 (Minolta Camera Co. Ltd.), Jan. 19, 1990 Abstract.

Max Vision—The Magic of Color, UC1260 Color Scanner, UMAX;®, Image & O.A., Feb. 1993.

COBRASCAN™, CX-300, Radiographic Digital Imaging, 1994.

* cited by examiner

Figure 5

COMPUTED RADIOGRAPHY X-RAY CASSETTE WITH RIGID EMBEDDED CR PLATE

CROSS-REFERENCE TO RELATED APPLICATION

The application is a Continuation-In-Part of application Ser. No. 10/386,326, filed Mar. 10, 2003 by applicant Steve Neushul entitled "AN APPARATUS AND METHOD OF CAPTURING IMAGES FROM ALTERNATIVE MEDIA TYPES," which is a Divisional of Ser. No. 09/747,616, filed Dec. 20, 2000, now U.S. Pat. No. 6,532,092, which is a Continuation of Ser. No. 09/450,031 filed Nov. 24, 1999, now U.S. Pat. No. 6,188,501.

BACKGROUND

1. Field of the Invention

The embodiments of the invention relate to x-ray cassettes and computed radiography plates. Specifically, embodiments of the invention relate to a system for creating images from a plate in a cassette and erasing the plate with improved reusability of the plate.

2. Background

Traditional x-ray film has been used for decades. 28 years ago, a fundamental innovation by Kodak created the first version of a re-usable X-ray plate instead of film. These Computed Radiography (CR) plates store a latent image in a photostimulatable storage phosphor plate. Fuji improved on the Kodak concept and produced the first medical X-ray images using this technique. The CR plate is reflective and erasable allowing repeated exposures, the number of possible exposures is greater than 150,000 if there are no mechanical stresses on the material. An x-ray impregnates the plate with energy which, when subsequently exposed to a particular excitation, is released, recreating the image. Scanners or CR readers of these plates typically include a flying spot laser and photomultiplier tube sensor. The photo multiplier tube captures the image corresponding to the energy being released by excitation of the flying spot laser. The plate is traditionally removed from a cassette and transported by a drive mechanism, typically a set of rollers. This roller type reading process necessitates that the phosphorescent plate be flexible. The feed mechanism used for scanning the plates is typically a set of pinch rollers. Over time the flexing and contact with the rollers causes a deleterious effect on the plate resulting in limited reusability. The phosphor materials in the plates do not degrade due to read/write cycles if mechanical and physical stresses do not act on the plate. Additional wear and tear on the plate is caused by the removal and replacement of the plate in a cassette that protects the plate from ambient energy (light) sources during transportation. In addition to causing degradation of the quality of the plate the pinch rollers can slip causing line artifacts and blurring of the image being generated.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1A:
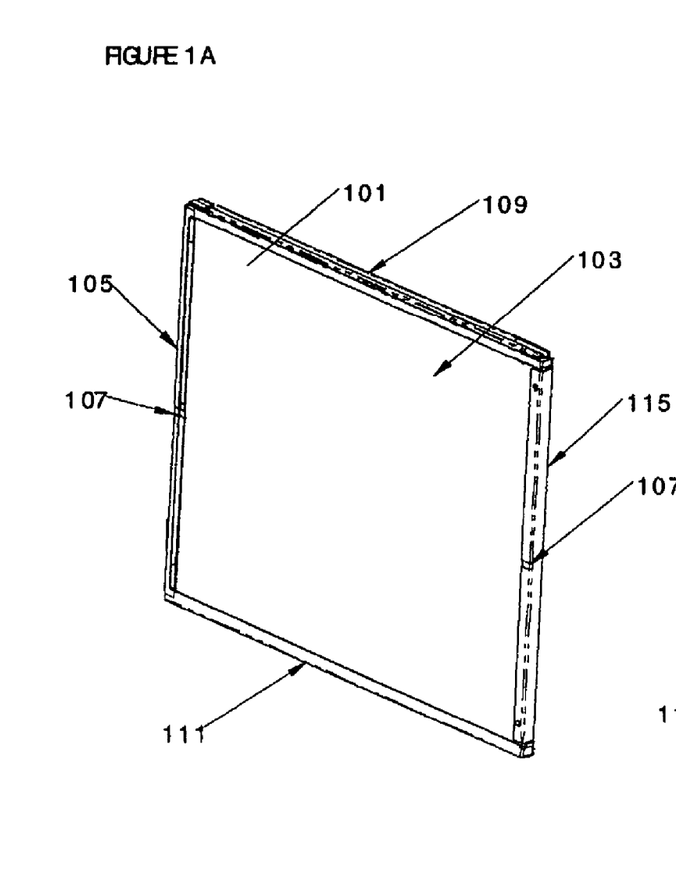
FIG. 1A is a diagram of a closed cassette.

FIG. 1A is a diagram of a closed cassette. In one embodiment, cassette 101 includes housing 111 to enclose a computed radiography plate. A computed radiography (CR) plate may be a plate covered in a phosphor storage material used to capture x-ray images. In another embodiment, other photostimulatable materials may be used to construct the CR plate. Housing 111 is constructed primarily from carbon fiber, aluminum, Delrin plastic and similar material that protect the CR plate from ambient energy sources.

In one embodiment, cassette 101 includes a sliding cover 103 or similar mechanism to provide access to an internal cavity of cassette 111 where the CR plate is embedded. In another embodiment, other exposure mechanisms may be employed to control access to the CR plate stored within housing 111. This may include hinged doors, spring loaded covers, form fit covers, snap fit covers and similar configurations. The CR plate may be affixed to the sliding or moving cover. In one embodiment, cassette 101 meets national emergency medicine association (NEMA) standards for size of x-ray cassettes.

In one embodiment, at either end of the cassette may be a set of steel strips 105, 115. Steel strips 105, 115 may be magnetized. In another embodiment, other magnetizable materials may be used. Steel strip 105 may be attached to the housing. Steel strip 115 may be attached to sliding cover 103. Cover 103 may slide in a track defined by housing 111 or move in relation to housing 111 by hinge or similar mechanism. In one embodiment, cover may be removed from cassette 101. Cover 103 may be constructed of carbon fiber, aluminum, Delrin plastic or similar materials. Steel strips 105, 115 may be used to move or hold cover 103 in relation to housing 111 in order to open and close cassette 101. Steel strips 105, 115 may include a notch 107. Notch 107 may be used to position cassette 101 in relation to a scanner. Magnetized protrusions may be attached to the scanner to interact with the notches 107 to allow manipulation of the cassette to open and close the cassette. In another embodiment, physical interconnections between cassette 101 and scanner 301 may be used to move cover 103 in relation to housing 111.

In one embodiment, cassette 101 may include an attachment mechanism 109 along an edge or side of cassette 101. Attachment mechanism 109 may be a clip, groove to fit a complementary tongue, hook or similar connection mechanism.

In one embodiment, cassette 101 may have a label attached to an outer surface. The label may be a bar code or similar electronically readable label. The label may be used to identify a patient, identify characteristics such as size of cassette and encode similar information.

Figure 1B:
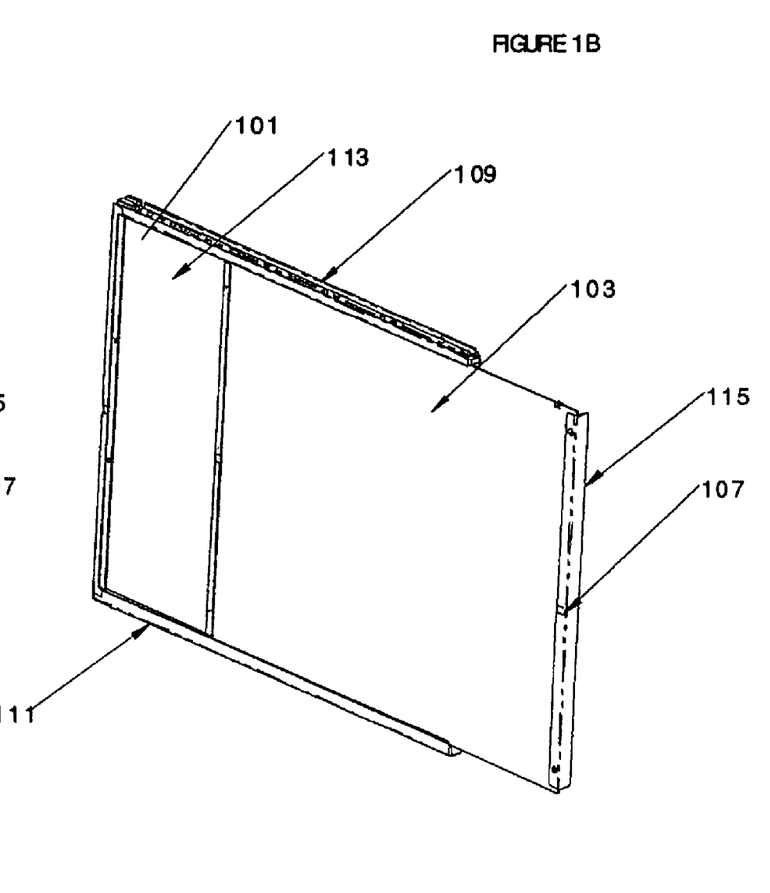
FIG. 1B is a diagram of an open cassette.

FIG. 1B is an illustration of a partially opened cassette. In one embodiment, cassette 101 encloses a CR plate 113. CR plate 113 may be exposed to a scanner or for other purposes by movement of housing 111 in relation to cover 103. Cover 103 may be form fit into a set of tracks in the housing allowing easy movement between an open and closed position.

Figure 2:
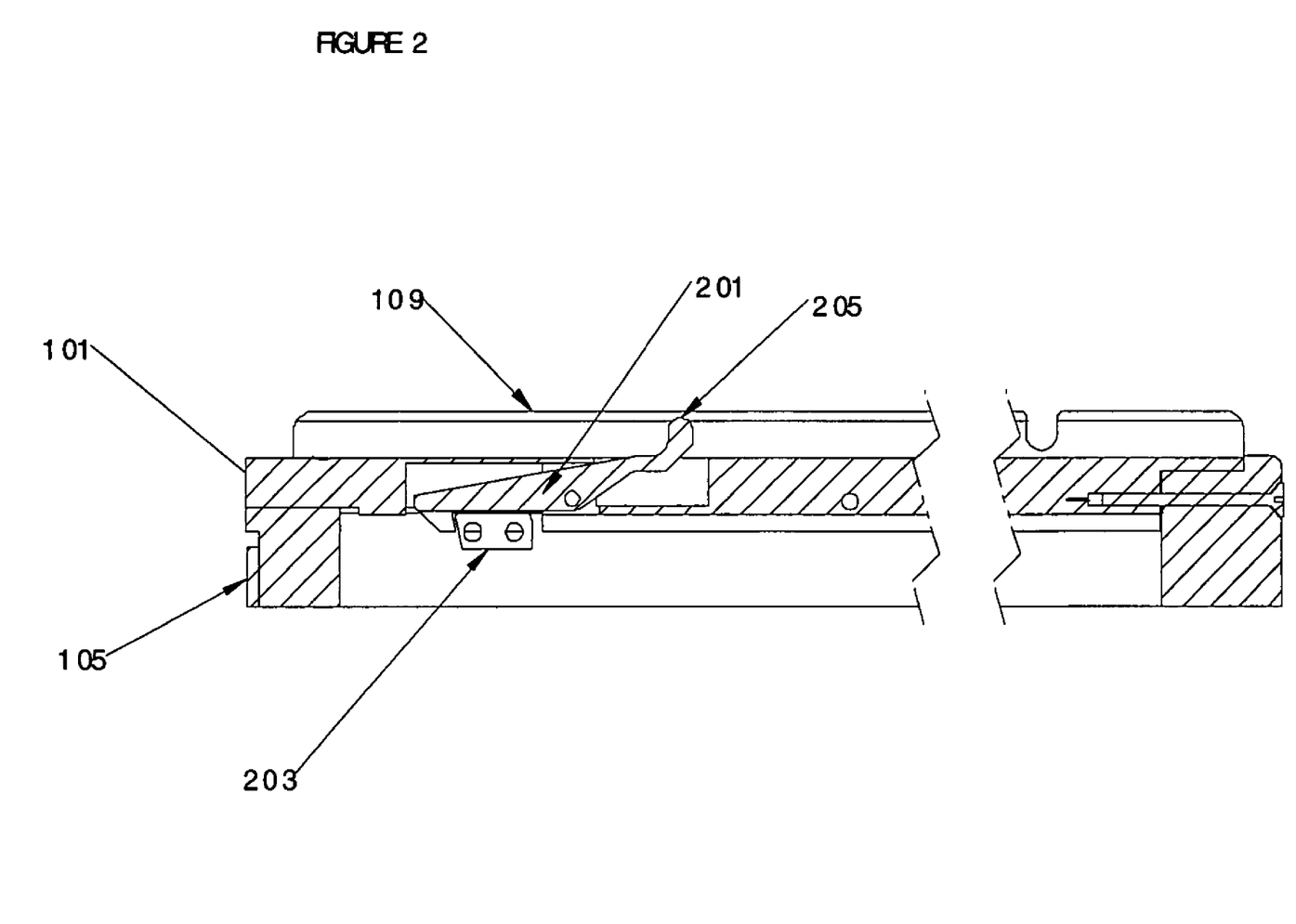
FIG. 2 is a side view of a scanning device and cassette with an exploded view of the coupling mechanism.

FIG. 2 is a cross section illustration of a securing mechanism. In one embodiment, cassette 101 may include a securing mechanism to secure cover 103 in relation to housing 111. In one embodiment, the securing mechanism may be a latch 201. Latch 201 may be spring loaded or similarly biased into a lock position where a catch 203 on cover 103 is engaged by latch 201. This prevents the movement of cover 103 in relation to housing 111. The locked position provides protection for CR plate 113 during transport. If cover 103 were to open accidentally then ambient energy sources may damage the stored image. In one embodiment latch 201 may be attached to housing 111 near the edge where attachment mechanism 109 is present. Latch 201 may include a protrusion 205 that protrudes through the exterior of housing 111. Pressure exerted on protrusion 205 may release latch 201 and allow the movement of cover 103. In one embodiment, the attachment of cassette 101 to a scanner automatically disengages latch 201.

Figure 3A:
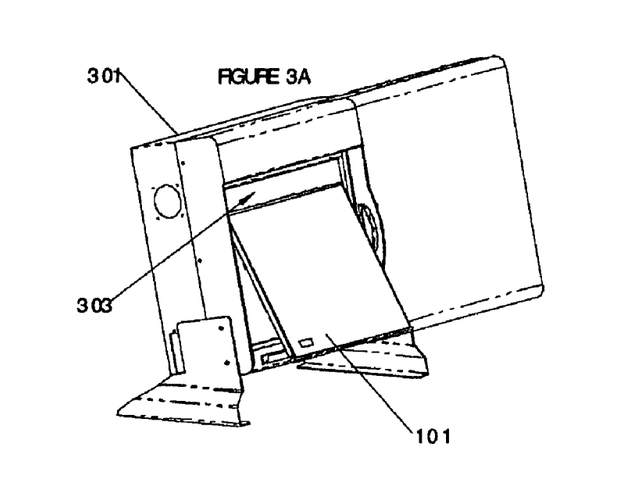
FIG. 3A is a diagram of scanner prior to loading of a cassette.
Figure 3B:
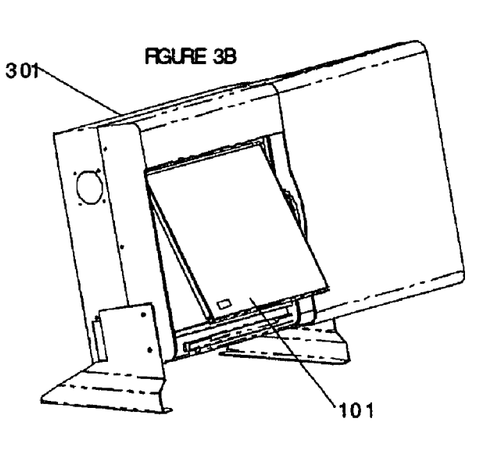
FIG. 3B is a diagram of a scanner with an attached cassette.

FIGS. 3A-3B illustrate the attachment of a cassette 101 to a scanner 301. FIG. 3A illustrates an embodiment where a scanner 301 has an open panel 303 for the insertion of cassette 101. Cassette 101 may be loaded through front panel 303. In another embodiment, scanner 301 does not have a front panel 303. Cassette 101 is placed adjacent a flat surface of scanner 301.

FIG. 3B illustrates the initial attachment of cassette 101 using a hook or clip type attachment mechanism 109. In one embodiment, cassette 101 is attached to scanner 301 using a hook or clip type attachment mechanism 109. Cassette 101 is angled to insert the forward protruding section of the hook, clip or similar device into a receiving groove, hook, slot or similar mechanism.

Figure 3C:
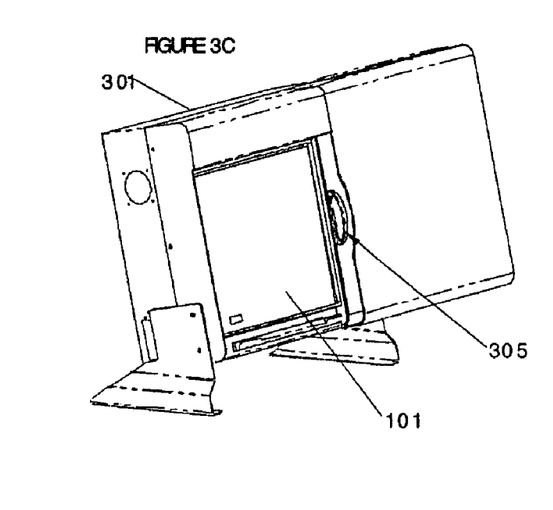
FIG. 3C is a diagram of a scanner with a secured cassette.

FIG. 3C is an illustration of the final placement of cassette 101 in scanner 301. In one embodiment, cassette 101 is laid flat against a surface of scanner 301. Cassette 101 may be coupled in a removable manner to scanner 301. The coupling mechanism may be a complementary hook, slot, groove, clip or similar system. In another embodiment, cassette 101 is form fit or set in a track in scanner 301. Scanner 301 may include a sliding or hinged door 305 to panel 303 that may completely enclose cassette 101.

In one embodiment, scanner 301 may move cassette 101 in a lateral or horizontal direction across the surface of scanner 301. Scanner 301 may include a scanning head such as a photo multiplier or charged coupled device (CCD) to capture the image of CR plate 113 as it is moves past the head. A set of magnets in scanner 301 may exert force on steel strips 105, 115 to move housing 111 while holding cover 103 in place thereby to expose CR plate 113 to the scanner head. In one embodiment, the magnets utilized in scanner 301 have a complementary polarity to magnetized steel strips 105, 115. In another embodiment, CR plate 113 may be attached to cover 103 and cover 103 moved past scanner 301. In a further embodiment, alternative movement mechanisms may be used to move housing 111 and cover 103. The movement mechanism may physically grip either cover 103 or housing 111 to move each component in relation to the other and to the scan head. Other movement mechanisms may include rollers, moving tracks, belts and similar mechanisms. Scanner 301 may also include a laser, set of light emitting diodes (LED) or similar energy source to erase CR plate 113.

In one embodiment, scanner 301 has a flat scan path to enable the reading of labels on cassette 101. Scanner 301 may include a label reader such as a bar code scanner. Scanner 301 may obtain information about a patient or the content of the x-ray being scanned or may obtain information about the characteristics of cassette 101 from the label. Scanner 301 may utilize the information obtained from the label to adjust the manner in which cassette 101 is scanned such as adjusting the length or speed of the scan or making similar adjustments. In one embodiment, data read from the label may influence handling of the digital representation captured by scanner 301. For example, label content may indicate where in memory or the file system of the host computer the digital representation is stored.

Figure 4:
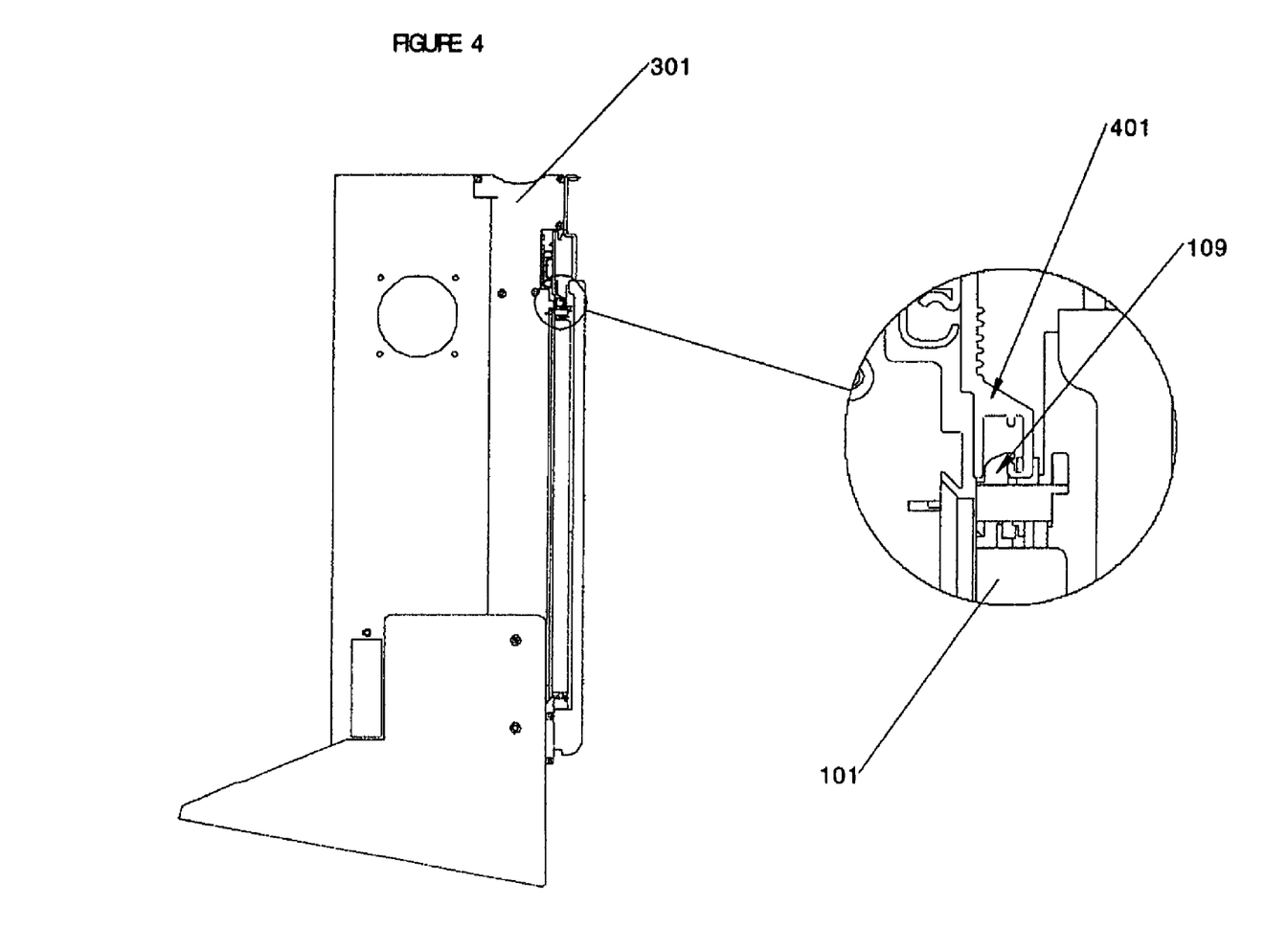
FIG. 4 is a diagram of a latching mechanism for a cassette.

FIG. 4 is a side view illustration of a non-enclosing scanner with and exploded view of an attachment mechanism. In one embodiment, attachment mechanism 109 may be a clip with a complementary slide clip 401 attached to scanner 301. Cassette 101 may rest against the front surface of scanner 301. Clip 109 may be nestled into an interlocking position with slide clip 401. Slide clip 401 may run the full length of cassette 101 and clip 109. Slide clip 401 may slide laterally or horizontally in a track or similar mechanism to allow the movement of cassette 101 past a scan head and erasure mechanism. Attachment mechanism 109 interlocked with slide clip 401 or similar mechanism may form an ultra rigid scan substrate for CR plate 113 to be scanned by scanner 301. In an exemplary embodiment, cassette 101 may have a clip type attachment mechanism 109 along the length of an upper edge. Cassette 101 may be placed at an angle to a complementary slide clip 401 on scanner 301. In this position the protruding edges of the complementary clips may rest against one another. A slight rotation of cassette 101 toward scanner 301 brings the complementary clips into an interlocking position and cassette 101 may rest flatly against scanner 301. A lateral force pushing or pulling cassette 101 away from scanner 301 may cause the clip of cassette 101 to disengage from slide clip 401.

In one embodiment, the secure attachment of cassette 101 to scanner 301 enables an ultra high resolution scan process where cassette 101 is driven past a scan head to obtain high fidelity. Thus, the scan resolution is not diminished by the slipping of pinch rollers. The system completes a scan of CR plate 113 without touching CR plate 113. This results in a scanning process that reduces wear on the photostimulatable material, enhances the lifetime of CR plate 113 and improves the reading of CR plate 113 during scanning. Scan and erase may take place simultaneously with the erase following the scan on the same cassette 101. This increases the throughput for the scanning system. This system may scan a CR plate 113 on average at a rate of better than twenty five seconds for a fourteen inch by seventeen inch plate.

In one embodiment, cassette 101 may have a concave inner surface or shape to define a concave space for CR plate 113. CR plate may have a matching concave shape. The concavity of CR plate 113 allows the scanning process and x-ray process to occur on a curved surface. The curve of the plate may match the spread of x-ray energy and the sweep of a scanning laser. The curve of CR plate 113 may be matched to the scanning laser to allow the operation of the scanner without the use of an F theta lens. F theta lenses have a high cost and a scanner 301 that does not require an F theta lens may have a reduced cost to manufacture. Scanning may be done under this circumstance without losing fidelity in the scanning process. The laser spot size will change as the laser scans from top to bottom along a flat surface. The spot may remain constant in size if the focal distance of the laser is maintained at a constant by curving CR plate 113 inside of cassette 113.

Figure 5:
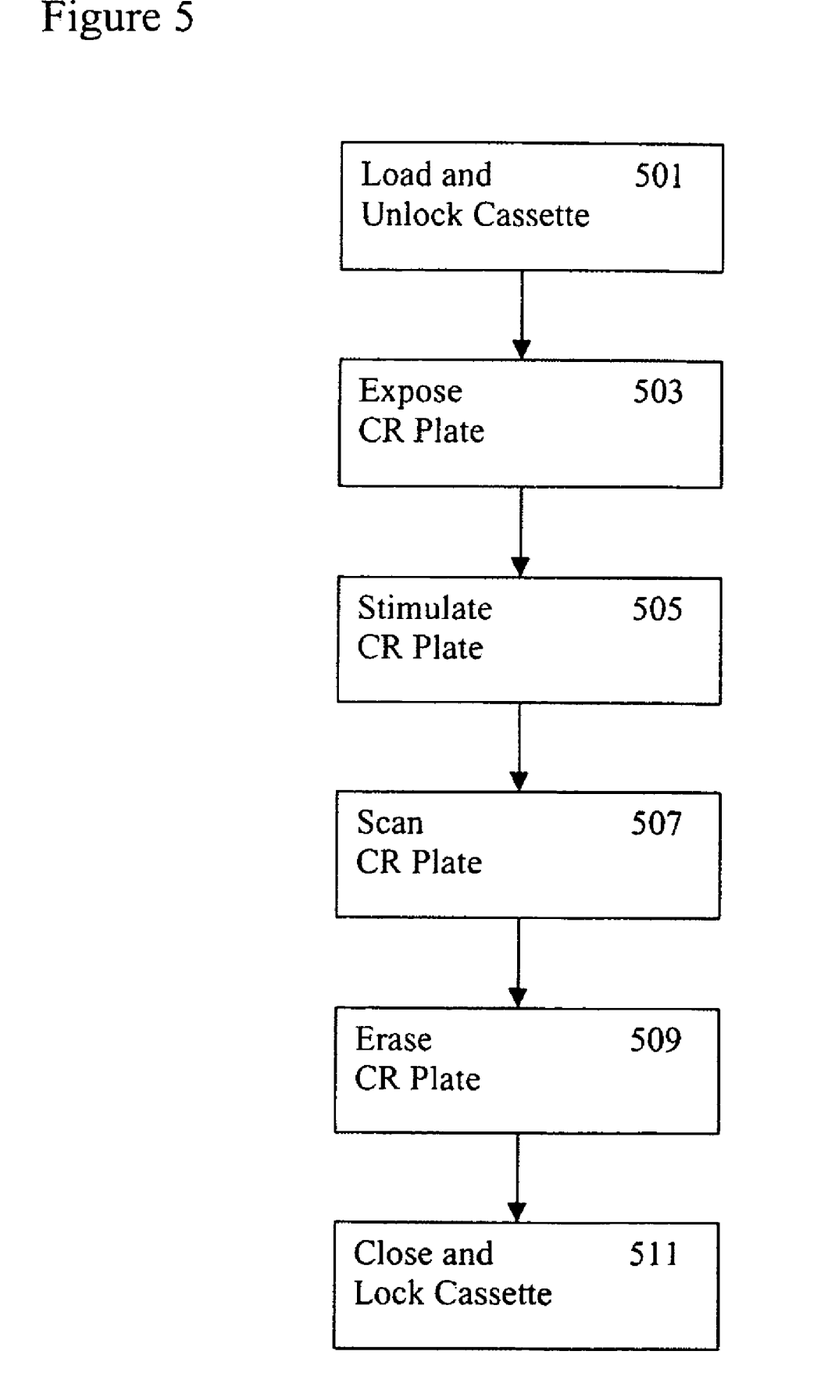
FIG. 5 is a flowchart of the operation of scanner operation.

FIG. 5 is a flowchart of the operation of a scanning device utilizing cassettes 101. In one embodiment, cassette 101 must be loaded into scanner 301 (block 501). Loading cassette 101 into scanner 301 may automatically unlock cassette 101 via latch 201 or similar securing mechanism. In one embodiment, loading cassette 101 involves engaging complementary attachment mechanisms of cassette 101 and scanner 101. Cassette 101 may have an attachment mechanism 109 such as a clip, hook, or similar attachment mechanism. Scanner 301 may have a complementary clip 401, hook, latch or similar attachment mechanism.

In one embodiment, scanner 301 may start to move cassette 101 via magnetic force, motorized movement of sliding clip 401 or similar movement mechanism while cover 103 is held in position by a magnetic force, latch or similar restraint thereby exposing CR plate 113 to scanner 301 (block 503). In an exemplary embodiment, cassette 101 may be attached to sliding clip 401. Sliding clip 401 may be attached to a track to allow it to slide across the surface of scanner 301. In one embodiment, the length of the slide track is approximately equal to twice the size of a cassette to allow a slide to completely expose CR plate 113 by sliding cassette 101 away from cover 103. Movement of sliding clip 401 in the track may be effected by an electric motor or similar mechanism. In one embodiment, scanner 301 may stimulate the phosphorous material of CR plate 113 using a flying spot laser or similar device while cassette 101 slides across the surface of scanner 301 (block 505). Scanner 301 continues to move CR plate 113 past a scanner head such as a photo multiplier or CCD to image the CR plate 113 (block 507).

In one embodiment, after CR plate 113 or a section of CR plate 113 has been imaged, scanner 301 may erase the plate or section using an LED or similar device (block 509). After the erasure and scan, scanner 301 may return cassette 101 to a closed position by sliding clip 401 back to its start position on the scanner track before allowing it to be unloaded (block 511). When cassette 101 is removed the locking mechanism may be engaged preventing accidental exposure during transport.

Cassette 101 may improve the reusability of a CR plate 113 by protecting CR plate 113 throughout its use. CR plate 113 remains encased in cassette 101 during x-ray capture, scan, erase and further reuse of CR plate 113. Cassette 101 prevents wear and tear on CR plate 113 that may cause it to degrade. For example, cassette 101 may be used when a patient has an x-ray taken without removing CR plate 113 from cassette 101. Cassette 101 may then be safely transported to scanner 301 where it is imaged and erased and made ready for reuse without CR plate 113 making any physical contact with scanner 301 or users. In one embodiment, scanner 301 may be part of a hybrid direct radiology solution. A patient may stand in front of an embedded CR plate in a cassette while in an enclosure where the plate receives the x-rays and scanner 301 reads and erases CR plate 113. Two cassettes may be rotated into scanner 301 to maintain one CR plate 113 in position for x-rays.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
    a photostimulatable unit;
    a housing to securely hold the photostimulatable unit; and
    a cover slidably coupled to the housing to move between a first position concealing the photostimulatable unit and a second position revealing the photostimulatable unit while the photostimulatable unit resides within the housing.

2. The apparatus of claim 1, wherein the cover is a sliding panel.

3. The apparatus of claim 1, wherein the photostimulatable unit is a computed radiography plate.

4. The apparatus of claim 3, wherein the computed radiography plate has a concave surface.

5. The apparatus of claim 1, further comprising:
    a release mechanism coupled to the housing to release the cover from the first position.

* * * * *

UNITED STATES PATENT AND TRADEMARK OFFICE
CERTIFICATE OF CORRECTION

| | | |
|---|---|---|
| PATENT NO. | : 7,375,350 B2 | Page 1 of 1 |
| APPLICATION NO. | : 10/714087 | |
| DATED | : May 20, 2008 | |
| INVENTOR(S) | : Neushul | |

It is certified that error appears in the above-identified patent and that said Letters Patent is hereby corrected as shown below:

On the Title Page,
In Item [12] and Item [76], please delete "Neusbul" and insert -- Neushul --.

Signed and Sealed this

Ninth Day of September, 2008

JON W. DUDAS
*Director of the United States Patent and Trademark Office*